United States Patent
Sidi et al.

(10) Patent No.: US 7,546,131 B1
(45) Date of Patent: Jun. 9, 2009

(54) EMULATING A MESSAGING OPERATION FOR MOBILE DEVICES

(75) Inventors: Maurice Sidi, Mountain View, CA (US); Jian Gong Deng, Foster City, CA (US); Julie Wu, Foster City, CA (US); Hanping Feng, Mountain View, CA (US)

(73) Assignee: Google Inc., Mountain View, CA (US)

( * ) Notice: Subject to any disclaimer, the term of this patent is extended or adjusted under 35 U.S.C. 154(b) by 343 days.

(21) Appl. No.: 11/335,992

(22) Filed: Jan. 20, 2006

(51) Int. Cl.
*H04W 4/00* (2006.01)

(52) U.S. Cl. .................. 455/466; 455/414.16; 455/565; 455/566; 455/550.1

(58) Field of Classification Search .................. 455/466, 455/414.1, 565–566, 550.1; 715/530, 855
See application file for complete search history.

(56) References Cited

U.S. PATENT DOCUMENTS

| | | | |
|---|---|---|---|
| 2002/0090963 A1 | 7/2002 | Avalos et al. | |
| 2004/0192277 A1 | 9/2004 | Pakarinen et al. | |
| 2005/0102638 A1* | 5/2005 | Jiang et al. .................. | 715/855 |
| 2005/0125211 A1 | 6/2005 | Nahata et al. | |
| 2005/0245241 A1* | 11/2005 | Durand et al. ........... | 455/414.1 |
| 2007/0130518 A1* | 6/2007 | Shavit et al. ................. | 715/530 |
| 2007/0149223 A1* | 6/2007 | Liang .......................... | 455/466 |
| 2007/0149252 A1* | 6/2007 | Jobs et al. .................... | 455/566 |
| 2007/0152980 A1* | 7/2007 | Kocienda et al. ............ | 345/173 |
| 2007/0152984 A1* | 7/2007 | Ording et al. ............... | 345/173 |
| 2007/0155434 A1* | 7/2007 | Jobs et al. .................... | 455/565 |

* cited by examiner

*Primary Examiner*—Charles N Appiah
*Assistant Examiner*—Michael T Vu
(74) *Attorney, Agent, or Firm*—Fish & Richardson P.C.

(57) ABSTRACT

A computer-implemented method of emulating a mobile device messaging operation may include receiving a request from a web browser that includes a text message; submitting the text message to a text message service provider; receiving from the text message service provider a response text message that is responsive to the text message; and generating a response, formatted for display on a web browser, that includes the response text message. The text message may comply with a short messaging service (SMS) format. The text message may include a request for information. The response may include a graphic of a mobile device around the response text message. In some embodiments, before receiving a request from the web browser, the computer-implemented method includes providing for the web browser a document having the graphic of the mobile device and capable of receiving user requests associated with the graphic.

19 Claims, 5 Drawing Sheets

EMULATING A MESSAGING OPERATION FOR MOBILE DEVICES

TECHNICAL FIELD

This disclosure relates to emulating a messaging operation for mobile devices.

BACKGROUND

Text messaging, or Short Message Service (SMS), is a service that allows short (e.g., 140 bytes or 160 characters) messages to be sent from and received by mobile devices, such as cell phones, smart phones, wireless personal digital assistants (PDAs), etc. The service facilitates transmission and reception of messages over control channels associated with wireless communication links, rather than over typical voice or data channels associated with the communication link. Multiple messages may be chained together to create messages that exceed 140 bytes in length. Such multiple messages may be used to transmit and receive long text messages, or non-text content, such as, for example, mobile ring tones for a mobile device or graphics for display as background images in a mobile device (e.g., wallpaper).

SMS messages may also be used to obtain information services. For example, an SMS information or search system ("SMS information system") may enable a user to send a query as an SMS message from a mobile device. In response, the SMS information system may provide one or more text messages that respond to the user's query. As a more particular example, a user may send a text message to an SMS information system that requests weather information for a particular city; in response, the SMS information system may provide one or more text messages that include weather information for the corresponding location, such as, for example, a current weather description, including temperature, humidity, and wind speed, and a forecast for the next day or two. As another example, a user may send a text message to the SMS information system, where the message requests phone number and address information corresponding to a person in a particular city; in response, the SMS information system may provide one or more text messages that include a phone number and address for the corresponding person.

Messages used to obtain information may require a special format, based on a particular information service requested. For example, the format of an SMS message requesting weather information may be different than the format of an SMS message requesting phone number or address information of a person. More particularly, a user may be required to include certain keywords in a text message requesting an information service in order to identify the desired service, or the user may be required to average query terms (e.g., a name of the city for which weather is requested, or a name of a person and a city) in a particular order, and the user may further be required to use particular punctuation.

The SMS information system may only process SMS information requests that are formatted as the SMS information system expects. In some cases, a mobile device user may be charged for each SMS message that he or she sends or receives, regardless of whether the message yields the intended result (e.g., provides desired information).

SUMMARY

This disclosure relates to systems and methods for emulating, on various devices, messaging operations that are intended for mobile devices. An SMS or text message information provider may provide the emulation system, and a user may access the emulation system from a networked computer device. For example, a user of a networked computer device may employ a browser running on the computer device to emulate a messaging operation for mobile devices. As a more particular example, the user may employ a browser to emulate an SMS message that requests and provides weather information for a particular city.

In one general aspect, a computer-implemented method of emulating a mobile device messaging operation includes receiving a request from a web browser that includes a text message; submitting the text message to a text message service provider; receiving from the text message service provider a response text message that is responsive to the text message; and generating a response, formatted for display on a web browser, that includes the response text message.

In some embodiments, the text message includes a payload of 140 bytes or less. The payload may include, for example, 160 or fewer 7-bit alphanumeric characters, 140 or fewer 8-bit characters, or 70 or fewer 2-byte characters. The text message may comply with a short messaging service (SMS) format. The request may include a Hyper Text Transfer Protocol (HTTP) command.

In some embodiments, the text message includes a request for information, and the requested information may be address or telephone information for a business, a residence or a person; directions from a first location to a second location; entertainment information; weather information; a stock quotation; a definition of a word; location information corresponding to an area code; or location information corresponding to a zip code. In some embodiments, the text message includes a request for a specific fact. In some embodiments, the text message includes a request for help in using the text message service or in accessing the text message service provider.

In some embodiments, the response includes a graphic of a mobile device around the response text message. In some embodiments, before receiving a request from the web browser, the computer-implemented method includes providing for the web browser a document having the graphic of the mobile device and capable of receiving user requests associated with the graphic.

In another general aspect, a computer-implemented method of emulating a mobile device messaging operation includes receiving in a web browser a first text message from a user and transmitting the first text message, receiving one or more responses to the first text message in the form of one or more web browser communications including a second text message, and displaying the second text message on a page in the web browser.

In some embodiments, the second text message is displayed within a graphic that depicts a mobile device, in a manner that emulates display of the second text message by the depicted mobile device. In some embodiments, the computer-implemented method further includes displaying to the user the graphic depicting the mobile device and a text messaging area in the graphic, before receiving the first text message. A first response text message corresponding to the graphic depicting the mobile device may be displayed on a first web browser page, and a second response message may be displayed on a second web browser page.

In another general aspect, a system for emulating a mobile device messaging operation in a web browser page includes an interface that receives a text message from at least one of a mobile device and a web browser, a response message generator that generates a response text message that is responsive to content in the text message, and a means for formatting the response text message for display on a web browser page.

In some embodiments, the means for formatting formats the response text message so that it is displayed on a web browser page inside a graphic depicting a mobile device to emulate display of the response text message by the depicted mobile device.

In some embodiments the response message generator includes a message parser that identifies one or more components of the text message, a message component router that routes the one or more components to at least one of a plurality of component processors based on content of the one or more components, and an aggregator that generates the response text message from output of one or more component processors.

In some embodiments, a component processor is a contact-information processor that receives a component that identifies a business, a residence or a person and provides output comprising at least one of a corresponding telephone number and a corresponding address. In some embodiments, a component processor is a directions processor that receives a component that identifies a first location and a second location and provides output comprising directions from the first location to the second location. In some embodiments, a component processor is an entertainment-information processor that receives a component that identifies an entertainment event and provides output comprising at least one of a location associated with the entertainment event and a description of one aspect of the entertainment event. In some embodiments, a component processor is a weather-information processor that receives a component that identifies a location and provides output comprising current weather information associated with the location. In some embodiments, a component processor is a stock-quotation processor that receives a component that identifies a stock or fund ticker symbol and provides output comprising at least one of a recent exchange price, a recent volume, a recent opening price, a recent range, and a recent corresponding market capitalization. In some embodiments, a component processor is a definition processor that receives a component that identifies a word and provides output comprising a definition of the identified word. In some embodiments, a component processor is an area-code processor that receives a component that identifies an area code and provides output comprising a location associated with the identified area code. In some embodiments, a component processor is a zip-code processor that receives a component that identifies a zip code and provides output comprising a location associated with the identified zip code.

Advantages of the system and techniques described herein may include any or all of the following. Users may learn of SMS information services, and SMS information service providers may advertise and promote their services. Users may view tutorial information for SMS services in a convenient format. Users may learn to use SMS services without being charged for SMS messages that do not yield desired results.

The general and specific aspects may be implemented using a system, a method, or a computer program, or any combination of systems, methods, and computer programs. The details of one or more embodiments are set forth in the accompanying drawings and the description below. Other features, objects and advantages will be apparent from the description and drawings, and from the claims.

DESCRIPTION OF DRAWINGS

These and other aspects will now be described in detail with reference to the following drawings.

Like reference symbols in the various drawings indicate like elements.

DETAILED DESCRIPTION OF EXEMPLARY EMBODIMENTS

This disclosure relates to systems and methods for emulating, on various devices, messaging operations that are intended for mobile devices. An SMS or text message information provider may provide the emulation system, and a user may access the emulation system from a networked computer device. For example, a user of a networked computer device may use a browser running on the networked computer device to emulate a messaging operation for mobile devices.

Figure 1:
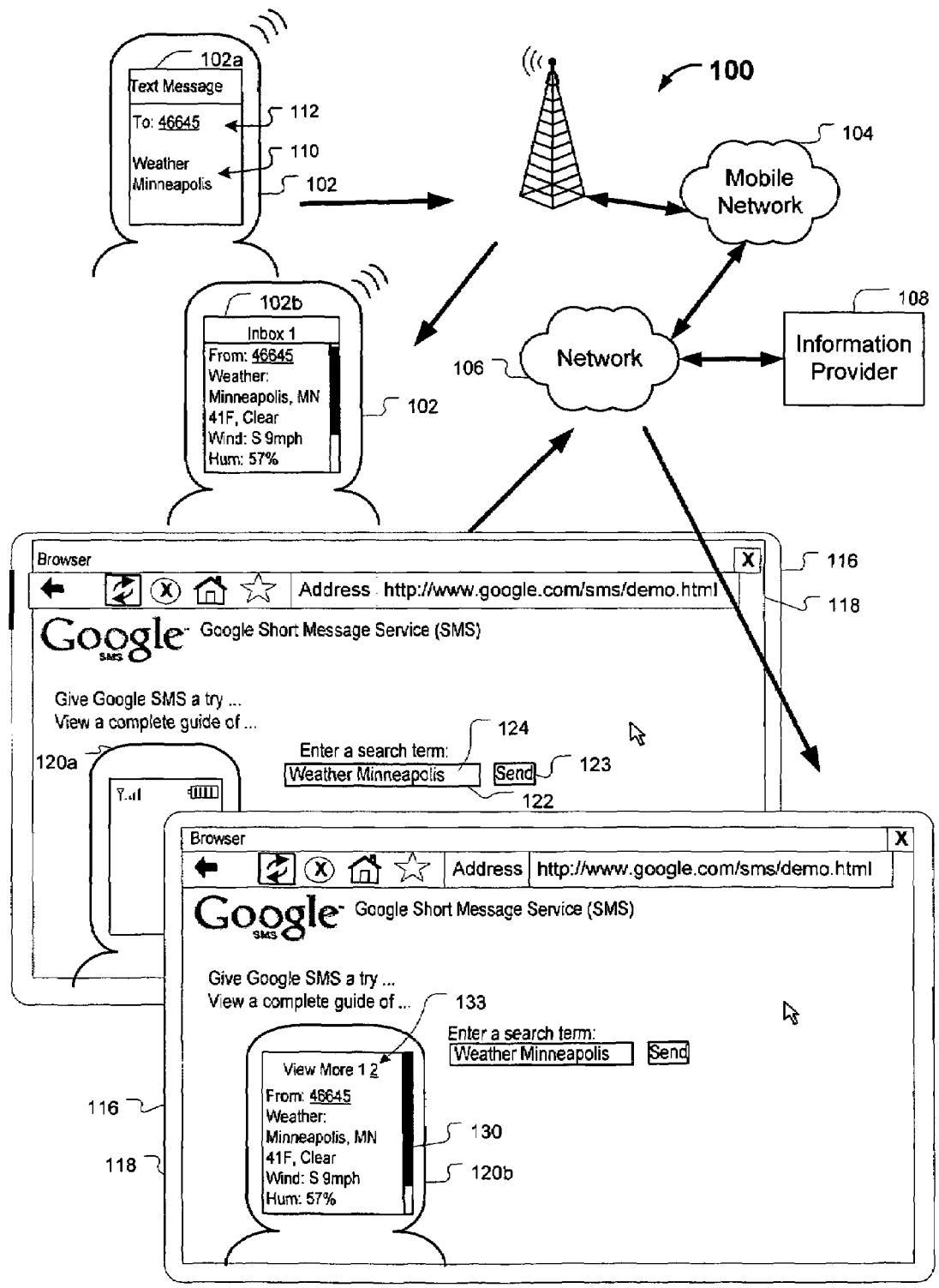
FIG. 1 is a diagram showing an exemplary environment in which browsers and mobile devices may operate, according to some embodiments.

FIG. 1 shows an exemplary environment 100 in which messaging services, such as SMS text messaging services, may be provided for mobile devices and emulated in computing devices. Messaging services may include, for example, text message responses to text message queries. For example, a text message query may include a request for address or telephone information, driving directions from one location to another location, weather information, a stock quotation, word definitions, or location information corresponding to an area code or a zip code. The messaging services may be available in various mobile devices such as, for example, a cell phone 102, smartphones, or wireless personal digital assistants (PDAs). The messaging services may be provided by a mobile network 104 along with other mobile services, such as voice and data services. The messaging services may be provided by an information provider 108 through another network, such as the network 106, which may connect to the mobile network 104. In some embodiments, the network 106 may include the Internet.

The information provider 108 may provide various messaging services to the cell phone 102, including, for example, response text messages in response to text message queries. The text message queries and the response text messages may comply with a specific format, such as a short messaging service (SMS) format. The format of the text messages may limit the amount of data being transferred in one text message. For example, the SMS format may limit the payload of a message to 140 bytes. In practice, this may translate to either 160 7-bit characters, 140 8-bit characters, or 70 2-byte characters.

Within the payload of the text messaging queries, the information provider 108 may have a predefined format to specify the type of service being requested. For example, the information provider 108 may provide a text message-based weather forecast service. The information provider 108 may require "weather" as a keyword to invoke the weather forecasting service and may also specify "weather [location]" as an acceptable format for obtaining a weather forecast for the specified location. Thus, a user of the cell phone 102 who wishes to obtain a weather forecast for a particular city, such as Minneapolis, may access the service by sending a text message to the information provider that identifies the weather forecast service and the corresponding location (e.g., "weather Minneapolis").

To route text messages to the information provider 108, the user may enter an identifier associated with the information provider 108. In some embodiments, the identifier may be a telephone number, a universal resource location (URL), or a predefined code. For example, a predefined code may be a "US short code"—a registered 5-digit code recognizable to mobile network operators in the U.S. As shown on a display 102a, a US shortcode 112 "46645" may correspond to a specific information provider, such as, for example, Google™. With the predefined code, the mobile network 104 may route text messages to the specified information provider using a protocol for transferring message between mobile devices, such as, for example, a Short Message Peer to Peer (SMPP) protocol.

Upon receiving the text message query 110 ("weather Minneapolis"), the mobile network 104 may route the query, using the US shortcode 112, to the information provider 108 via the network 106. The information provider 108 may process the request by parsing the query 110 and determine that the user is requesting a weather forecast for the city of Minneapolis. The information 108 provider may obtain a corresponding weather forecast by, for example, searching an internal database (not shown), searching the Internet, or querying an internal weather component. Further detail of how the information provider 108 may operate is discussed with reference to FIG. 2. Upon obtaining the result (a weather forecast for Minneapolis), the information provider 108 may generate a response by formatting the result as a text message. The information provider 108 may then send the generated response to the originating device (e.g., the cell phone 102), via the networks 106 and 104. The result may be formatted as a text message in the cell phone 102, as shown in a cell phone display 102b.

Various computing devices may also communicate with the information provider 108 via the network 106, and a computing device (graphically depicted by screen 116), may emulate messaging operations of mobile devices. The computer device 116 may provide an interface, such as, for example, a browser page 118, to emulate text messaging on a mobile device. A user may employ the interface 118 to send a text message query to the information provider 108. In some embodiments, the interface may use a protocol such as Hyper Text Transfer Protocol (HTTP) to send the text message request to the information provider 108. The information provider 108 may respond by sending a result that is responsive to the request back to the computer device 116 via the network 106. The computer device 116 may display the received result on the interface 118 in a manner that emulates display of the response by a mobile device.

As shown in FIG. 1, the computer device 116 displays a web browser page 118 with a graphic 120a depicting a mobile device, such as the cell phone 102. The browser page 118 also includes a text box 122 to emulate text input that may be sent as a text message query from the mobile device, and a send button 123 to allow a user to submit the text input to a corresponding information provider. As an example, the computing device 116, via the web browser 118, may receive the text input 124 "weather Minneapolis." The computing device 116 may send the text input to the information provider 108 (via the network 106). In some embodiments, the text input may be formatted as a text message query. The information provider 108 may submit the received text input 124 to a text service provider. In some embodiments, the text service provider may be part of the information provider 108. In some embodiments, the text service provider may be external to the information provider (not shown). The information provider 108 then may generate a response to the received text input 124 according to the predefined format for a text message service, such as a weather forecast service. The information provider 108 may format the response for display in a browser page 118 and send the formatted response to the computer device 116. A more detailed description of an exemplary information provider 108 is now provided with reference to FIG. 2.

Figure 2:
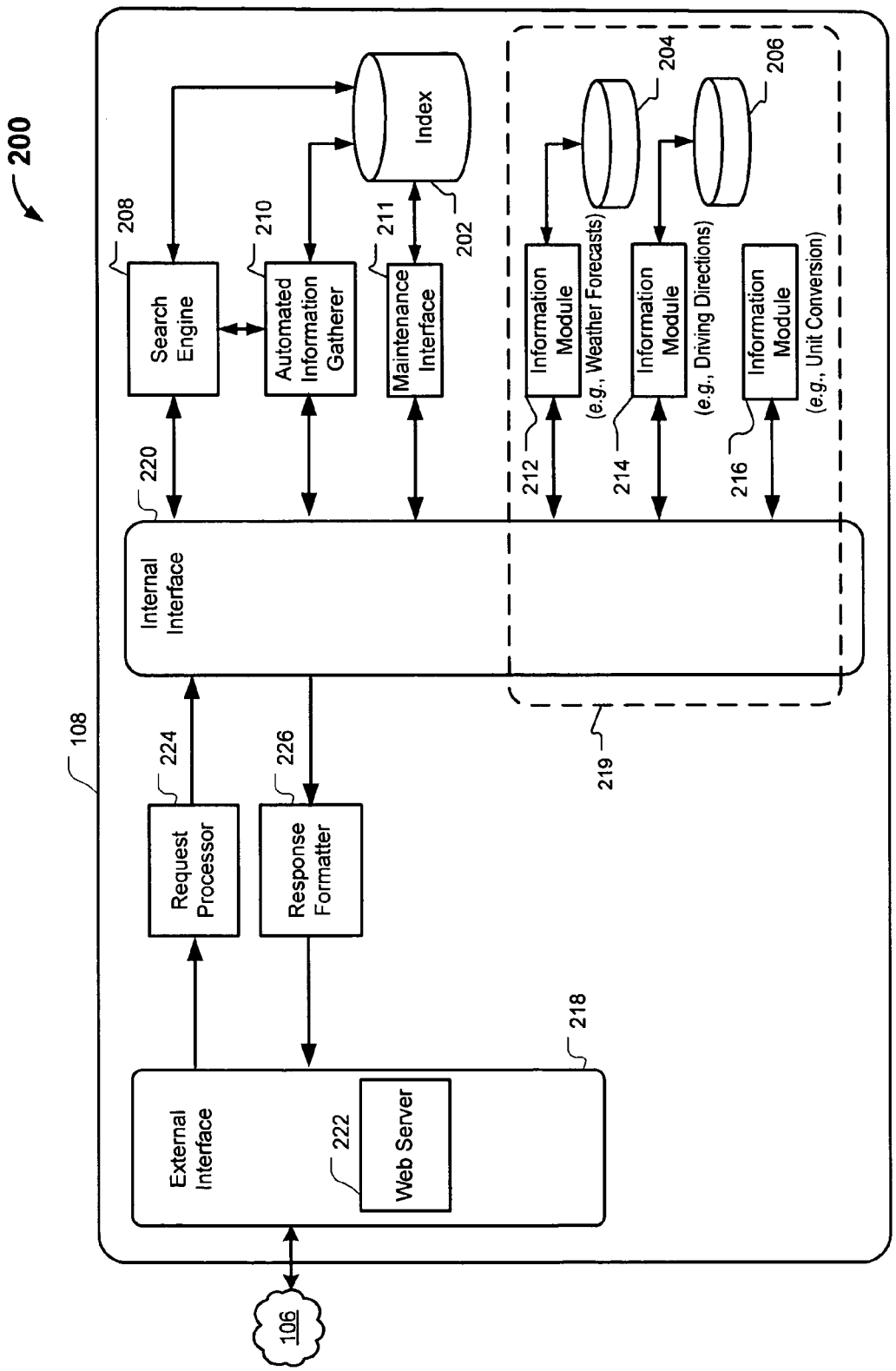
FIG. 2 is a schematic diagram showing details of an exemplary information provider, according to some embodiments.

FIG. 2 generally illustrates various components of an information provider 108 that may receive text message queries, generate responses to the text message queries and send the responses to the appropriate device. Users of both mobile devices and browsers running on other devices may generate text message queries, and the information provider 108 may employ the same components to generate responses to the text message queries, regardless of the device from which the corresponding text message queries originate. Before being sent to the originating device, a response may be appropriately formatted. For example, a response may be formatted as one or more text message responses if it is being sent to a mobile device. If the response is being sent to a browser on another computing device, the response may be formatted as a browser page that emulates display of the response in a mobile device.

As shown, the exemplary information provider 108 includes an external interface 218, an internal interface 220 and a text service provider 219. In some embodiments, as shown, the information provider 108 may also include a search engine 208. The information provider 108 receives text message queries, and in some embodiments, other queries, through the external interface 218. The information provider 108 may include a web server 222 that processes web queries. Portions of the web server 222 may be included in the external interface 218, as shown, or the web server 222 may be a separate component, distinct from the external interface 218.

The information provider 108 may employ a request processor 224 and the internal interface 220 to appropriately route queries to a search engine 208 or to the text message service provider 219. The request processor 224 may parse requests, and, if necessary, reformat them (e.g., from HTML (hypertext markup language) or text message format, to search strings that are compatible the search engine 208, or to query strings that are compatible with the text message service provider 219).

In some embodiments, parsing the requests may include identifying a format associated with the query based on information in a header of the request. For example, header information may identify a query as a text message query, or header information may identify a query as a search engine query from a browser. Parsing the requests may also include identifying fields and keywords in the query string. For example, the request processor 224 may identify a keyword in a text message query, such as "weather," or "from" and "to," or "price," or "define." Or, the request processor 224 may identify various fields in a query, such as a name and a city, a name and a zip code, a stock ticker symbol, or a factual query. The fields may be identified by context, by length or by other fields present within a search query, and the request processor 224 may verify its identification of one or more fields by checking the field against an index. For example, the request processor 224 may search an index of stock ticker symbols for a match any time a query string includes a three-character element. As another example, the request processor 224 may search an index of U.S. zip codes for a match any time a query string includes an element having five numbers. As another example, the request processor 224 may search an index of cities or states for a match of elements that follow keywords such as "weather," "to" or "from."

In some embodiments, the internal interface 220 may appropriately route a query after it has been processed by the request processor 224. For example, if the request processor 224 identifies a text message query as a request for a weather forecast, the internal interface 220 may route the text message query to a particular information module (e.g., the information module 212) within the text message service provider 219. As another example, if the request processor 224 identifies a text message query as a request for driving directions, the internal interface 220 may route the text message query to another information module (e.g., the information module 214). As yet another example, if the request processor 224 identifies a query as a search engine query from a web browser, the internal interface 220 may route the query to the search engine 208.

In some embodiments, at least portions of the request processor 224 may be included within individual information modules 212, 214 and 216. For example, the internal interface 220 may route text message queries to each information module 212, 214 and 216. A request processor within each information module 212, 214 or 216 may analyze the text message query for specific keywords or fields. For example, a weather module (e.g., module 212) may analyze a text message query to determine if the keyword "weather," or some variation thereof (e.g., "waether," "wether," "weathr," etc.), is included in the text message query. If the appropriate keyword or field is included, the information module may provide a response; if not, the information module may ignore the query. For example, a driving directions module (e.g., module 214) may generate a response to a query if the keywords "to" or "from" are included in the query but may ignore queries that include the keyword "weather." In some embodiments, multiple information modules may generate a response, and another component, such as a response formatter 226 may select one or more of the responses to send to the originating device.

The response formatter 226 may format responses generated by the information modules 212, 214 and 216 for delivery to originating devices. For example, the response formatter 226 may format a response as one or more text messages, when the corresponding original query was a text message query originating from a mobile device. As another example, when the original query originated from a web browser (e.g., a web browser interface that emulates a text message service), the response formatter 226 may format the response within a browser page that includes a graphic that emulates a mobile device. The browser page may be formatted such that the response is displayed within the graphic of the emulated mobile device, appearing as it would if it were displayed in the emulated mobile device itself. After the response formatter 226 formats responses, the formatted responses may be routed to appropriate devices by the external interface 218.

Although only three information modules 212, 214 and 216 are shown in the exemplary information provider 108, the information provider 108 may include many more modules that provide services other than those already described. The information provider 108 may include at least one of the following information modules. The information provider 108 may include a contact information module that receives a request identifying a business, a residence or a person and that provides a corresponding telephone number and/or a corresponding address to the request. The information provider 108 may include a directions module that may provide driving directions from one location to a second location. The information provider 108 may provide an entertainment module that provides information about entertainment events at a particular location. The information provider 108 may include a stock quotation module that identifies a stock or fund ticker symbol and provides a recent exchange price, a recent volume, a recent opening price, a recent range, or a recent market capitalization of the stock or fund. The information provider 108 may provide a definition module that provides word definitions. The information provider 108 may provide information about a location based on an area code or a zip code using an area code module or zip code module.

An information module may be associated with a dedicated database or index. For example, the information module 212 may be associated with a database 204, and the information module 212 may generate responses to queries based on information in the database 204. Contents of the database 204 may be updated by other components of the information provider 108, such as by the automated information gatherer 210, which is described in more detail below.

The interfaces 218 and 220 are shown as distinct interfaces, but they may be partially or fully combined, or they may include additional interfaces. As an example, the internal interface 220 may comprise interface devices for a high-speed, high-bandwidth network such as SONET, Infiniband, or Ethernet, or any suitable communication hardware operating under an appropriate protocol such that the information provider 108 can respond to a large number of distinct requests simultaneously. The external interface 218 may comprise network interface cards (NICs) or other communications devices and may similarly include components or interfaces of a high-speed, high-bandwidth network. The precise design of the information provider 108 is not critical to this disclosure and could take any suitable form.

In some embodiments, the information provider 108 may include a search engine 208 and various other components that support the operation of the search engine, such as an index database 202, and automated information gatherer 210 and a maintenance interface. The index database 202 may contain data that the information provider 108 provides to users. For example, the information provider 108 may include a typical Internet search engine 208, and the index database 202 may contain links to information stored on the Internet (e.g., outside of the information provider 108). The information in the information database 202 may be gathered by the automated information gatherer 210 (e.g., a crawler or a spider). The information gather 210 may continuously or almost continuously obtain new information from sources connected to the network 106. The automated information gatherer 210 may also retrieve content in response to a search query. In addition to being obtained in an automated fashion, information may also be manually loaded in or retrieved from the index database 202 through a maintenance interface 211. The maintenance interface 211 may allow an administrator of the information provider 108 to manually add or extract bulk data to or from the index database 202.

Figure 3:
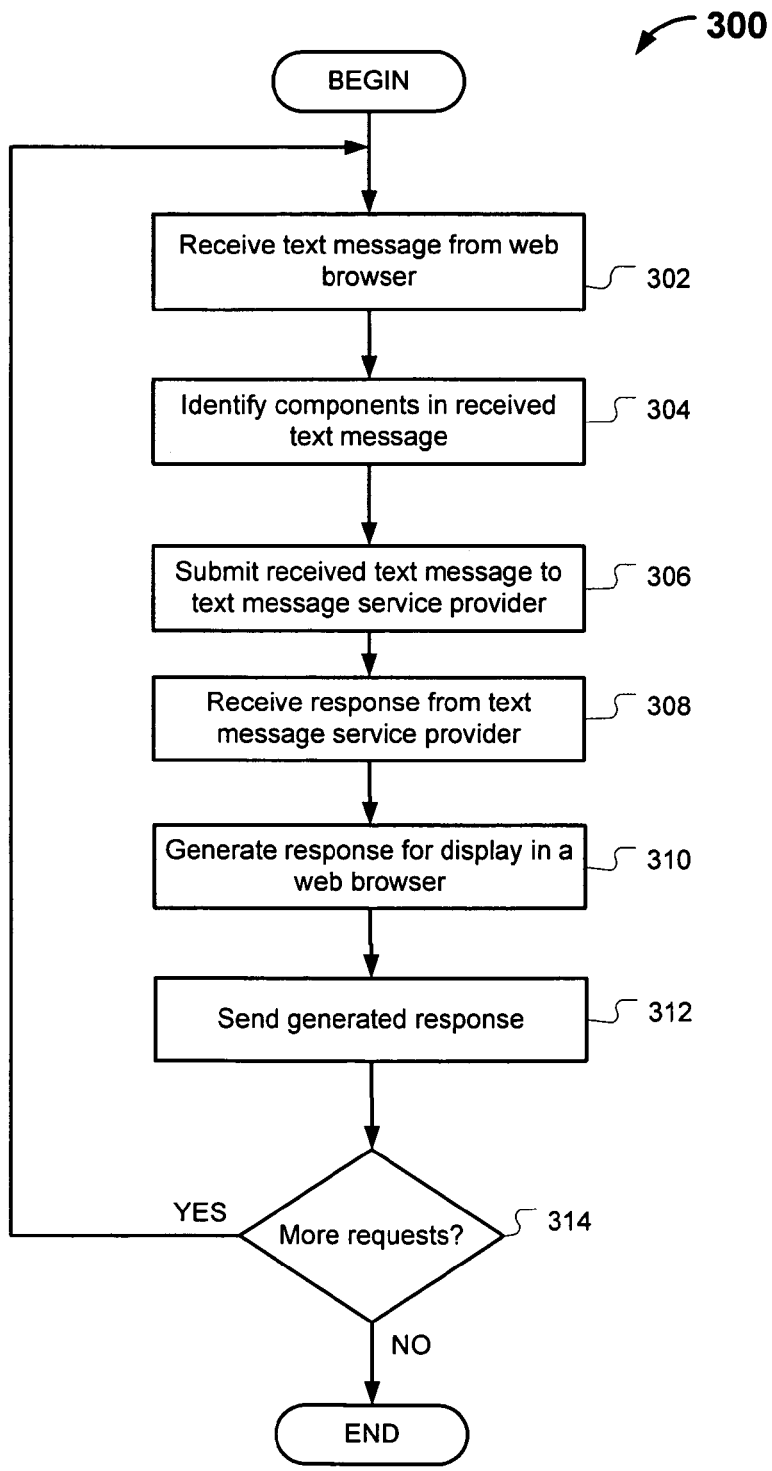
FIG. 3 is a flow diagram illustrating an exemplary method of generating responses to text message queries, according to some embodiments.

FIG. 3 is a flow chart of an exemplary method 300 for generating responses to text message queries or text message service requests. FIG. 3 generally illustrates a method that may be implemented by an information provider, such as the exemplary information provider 108 that is shown in FIG. 2. With the method 300 the information provider 108 may receive a text message queries from a web browser running on a computing device and may generate a response text message that is displayed in a web browser page. The web browser page may emulate display of the response text message in a mobile device, such as a cell phone.

The method 300 receives, at 302, a text message from a web browser. For example, the information provider 108 may receive, via the network 106 and at the web server 222, a query. The query may be formatted as an HTML message that includes an encapsulated text message query. The encapsulated text message query may include, for example, a request for a weather forecast in a particular city (e.g., "weather Minneapolis").

The method 300, at 304, identifies components in the received text message. For example, the request processor 224 may identify one or more keywords or fields in the text message. Referring to the example above, the request processor 224 may identify the keyword "weather" and a location field "Minneapolis."

The method 300, at 306, submits the received text message to a text message service provider. For example, the request processor 224 and the internal interface 220 may route the received text message to the text message service provider 219. In some embodiments, the internal interface 220 may route the text message to all information modules (e.g., modules 212, 214 and 216) within the text message service provider; in some embodiments, the internal interface 220 may route the text message to only a certain information module (e.g., a weather forecasting module 212). At least one module to which the text message is routed may generate a response text message. Referring again to the example above, the module 212 may generate a response text message with current weather information for Minneapolis.

The method 300, at 308, receives a response from the text message service provider. For example, the response formatter 226 may receive a text message response from the module 212, and the text message response may include weather information associated with Minneapolis. In some embodiments, multiple responses may be received at 308. For example, the original text message may be submitted to more than one information module 212, 214 or 216, and more than one information module 212, 214 or 216 may provide a response to the response formatter 226.

The method 300, at 310, generates a response message for display in a web browser. For example, the response formatter 226 may generate a browser page that includes a graphic that emulates a mobile device, such as a cell phone. At least a portion of the response message may be formatted for display within the graphic of the mobile device, thereby emulating display of the response message by the actual emulated mobile device. Other portions of the response message, if any, may be formatted for scroll display in the web browser, upon selection of a scroll bar 130 (see FIG. 1) by a user. Other portions may also be formatted for display in a separate, similar browser page that emulates a second response text message. A user of the browser may be able to view the separate browser page by selecting a link, such as the link 133 that is shown in FIG. 1.

The method 300, at 312, sends the generated response to the appropriate device. For example, the web server 222, or the external interface 218, or a combination of the two, may send the browser page(s) generated by the response formatter 226 to the device from which the corresponding original text message was received (at 302). After sending the generated response, the method 300, at 314, either loops back to process more requests, or terminates.

Figure 4:
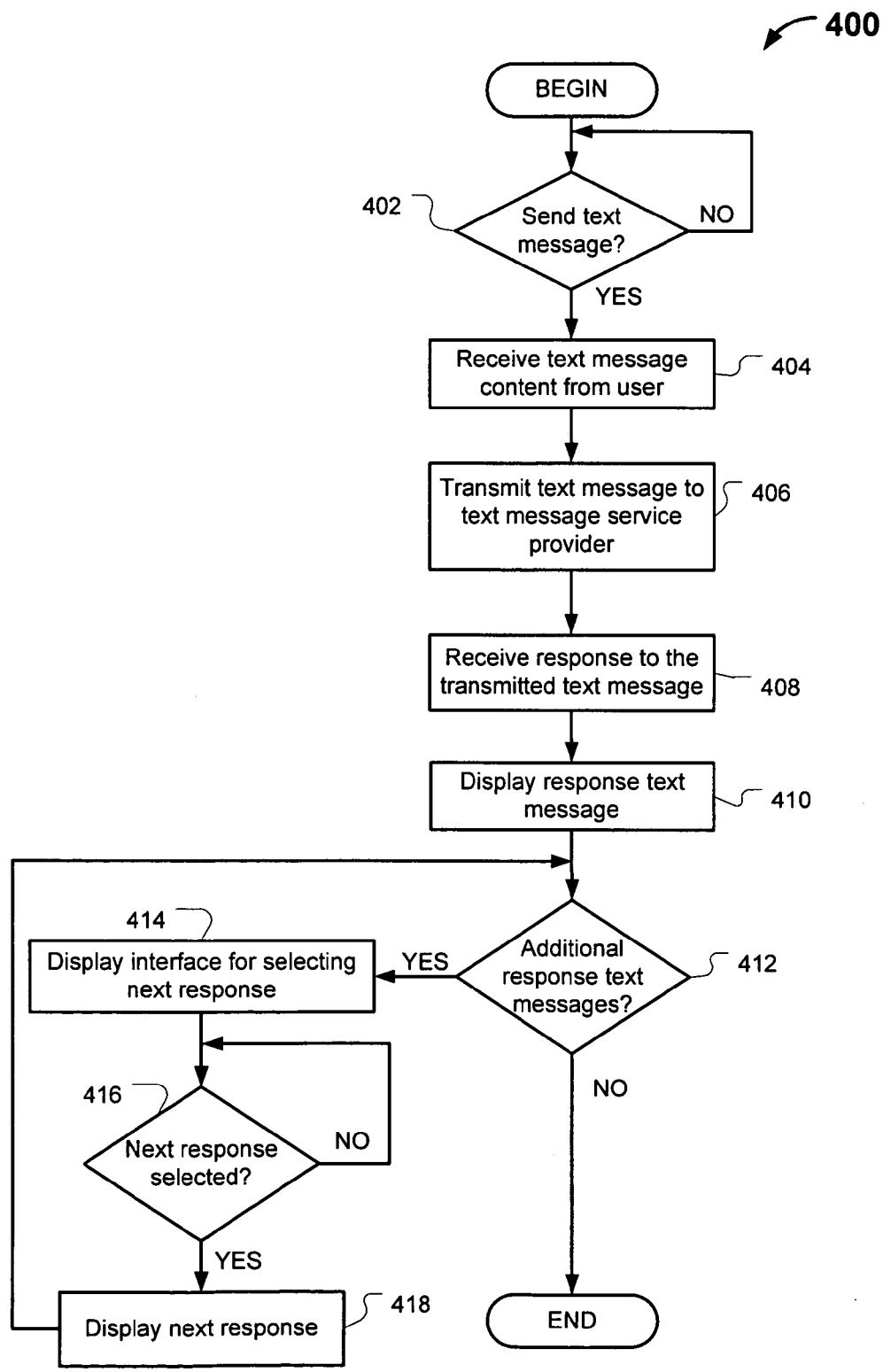
FIG. 4 is a flow diagram illustrating an exemplary method of displaying text message responses in a browser, according to some embodiments.

FIG. 4 is an exemplary method 400 of emulating display of a text message response in a mobile device. FIG. 4 may be performed by a computing device running a web browser. The web browser may display a graphic that emulates a mobile device, such as a cell phone, and the text message response may be displayed within the graphic, thereby emulating display of the text message response by an actual mobile device.

The method 400, at 402, waits to receive input from a user indicating that the user wishes to emulate a text message service in the web browser. For example, referring to FIG. 1, the method 400 may be invoked upon a user's navigation to the browser page 118.

The method 400, at 404, receives text message content from the user. For example, the computing device 116 may capture a search string 124 that the user enters in a search box 122. The method 400, at 406, transmits the text message content to a text message service provider. For example, upon the user's selection of the "send" control 123, the computing device 116 may format the user-entered content 124 as a text message, and may send the text message to the information provider 108.

The method 400, at 408, receives a response to the transmitted text message. For example, the information provider 108 may generate a response text message and send the response text message to the computing device 116, as described with reference to FIG. 3.

The method 400, at 410, displays the response text message. For example, the computing device 116 may display a browser page 118 that includes a graphic 120b that depicts a mobile device, such as a cell phone. The browser page 118 may be formatted such that the response message is displayed within the graphic 120b, thereby emulating display of the response text message by an actual mobile device.

In some embodiments, multiple response text messages may be generated in response to the original text message. The method 400, at 412, determines if there are additional response text messages to display. If not, the method 400 terminates. If there are additional text messages to display, the method 400, at 414, displays an interface for selecting a next response. For example, the emulated mobile device graphic 120b may include a link 133 representing an additional text message associated with the original text message query. In some embodiments, the interface may be displayed (414) at the same time the initial response text message is displayed (410).

The method 400, at 416, detects user input that specifies that an additional text message should be displayed, and the method 400, at 418, displays the next response. For example, upon user selection of the link 133, the computing device 116 may reload the browser page 118 with a second response message displayed within the graphic 120b (not shown,). In this manner, the browser page 118 may accurately emulate multi-message response messages from a text message service provider.

Figure 5:
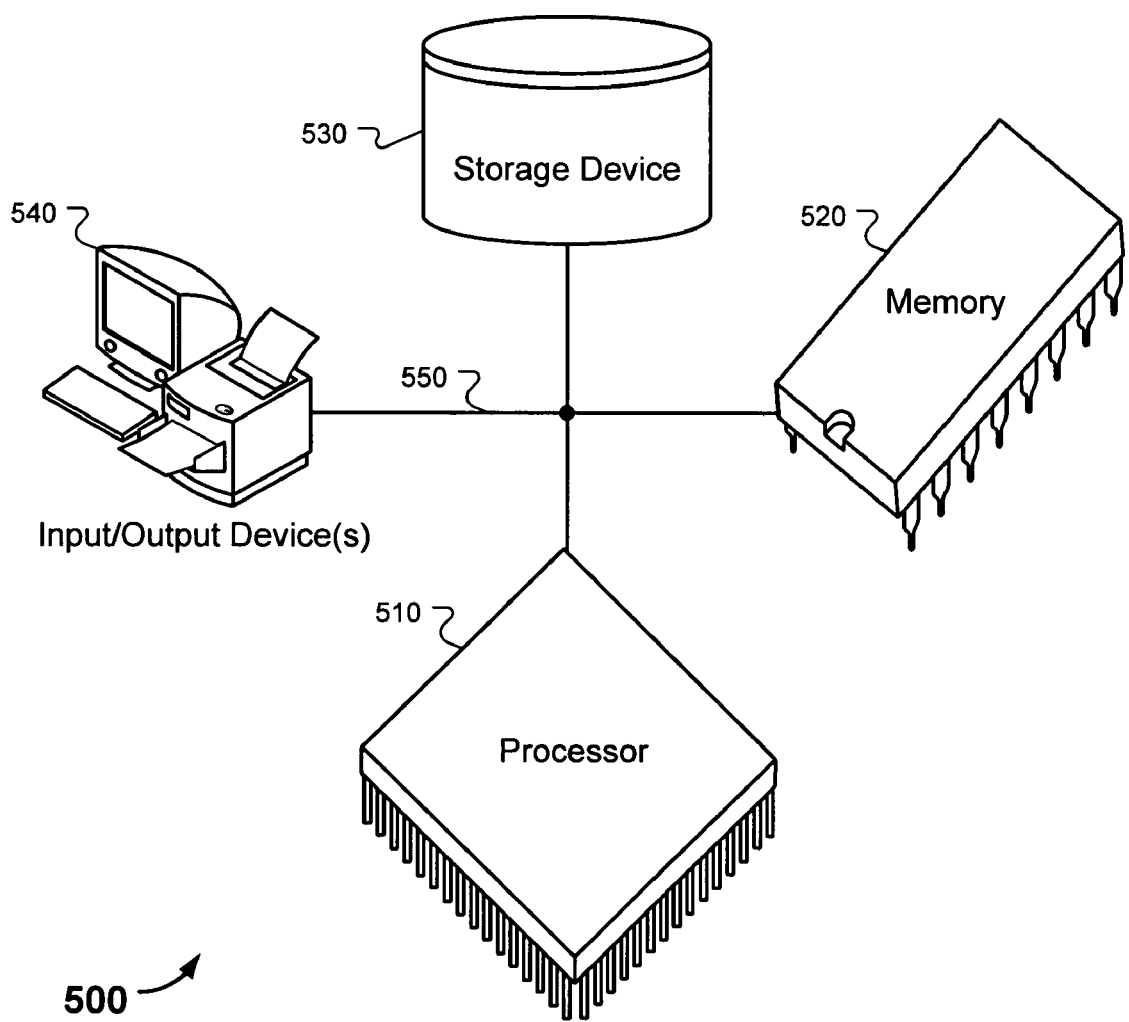
FIG. 5 is a schematic diagram of an exemplary computing system, according to some embodiments.

FIG. 5 is a schematic diagram of an exemplary computing system 500. The system 500 may be used to perform the method 300 or the method 400 described above, according to some embodiments. The system 500 may be included the mobile communication device 102; the computer device 116; the information provider 108; or portions of the information provider 108, such as, for example, the search engine 208, the information modules 212, 214, 216, or the web server 222.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In some embodiments, the processor 510 is a single-threaded processor. In some embodiments, the processor 510 may be a multi-threaded processor. The processor 510 is capable of processing instructions stored in the memory 520 or on the storage device 530 to display graphical information for a user interface on the input/output device 540.

The memory 520 stores information within the system 500. In some embodiments, the memory 520 is a computer-readable medium. In some embodiments, the memory 520 is a volatile memory unit. In some embodiments, the memory 520 is a non-volatile memory unit.

The storage device 530 is capable of providing mass storage for the system 500. In some embodiments, the storage device 530 is a computer-readable medium. In various different embodiments, the storage device 530 may be a floppy disk device, a hard disk device, an optical disk device, or a tape device.

The input/output device 540 provides input/output operations for the system 500. In some embodiments, the input/output device 540 includes a keyboard and/or pointing device. In some embodiments, the input/output device 540 includes a display unit for displaying graphical user interfaces.

The features described in this disclosure can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described embodiments by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard or keypad and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few embodiments have been described in detail above, other modifications are possible. Portions of this disclosure discuss electronic documents, including HTML, but any number of formats may be processed by the described system, including without limitation, XML, WML, PDF (Portable Document Format), word processing formats, and image formats. Also, the logic flows depicted in the figures do not require the particular order shown, or sequential order, to achieve desirable results. Also, other steps may be provided, or steps may be eliminated, from the described flows, and other components may be added to, or removed from, the described systems. Accordingly, other embodiments are within the scope of the following claims.

Embodiments may be implemented, at least in part, in hardware or software or in any combination thereof. Hardware may include, for example, analog, digital or mixed-signal circuitry, including discrete components, integrated circuits (ICs), or application-specific ICs (ASICs). Embodiments may also be implemented, in whole or in part, in software or firmware, which may cooperate with hardware. Processors for executing instructions may retrieve instructions from a data storage medium, such as EPROM, EEPROM, NVRAM, ROM, RAM, a CD-ROM, a HDD, and the like. Computer program products may include storage media that contain program instructions for implementing embodiments described herein.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method of emulating a mobile device messaging operation, comprising:
   receiving, from a web browser executed by a computer device, a request that includes a text message;
   submitting the text message to a text message service provider that is external to the computer device;

receiving from the text message service provider a response text message that is responsive to the text message; and generating a response, formatted for display within a graphic of a mobile device on the web browser, that includes the response text message, and sending the response to the computer device.

2. The computer-implemented method of claim 1, wherein the text message comprises a payload of 140 bytes or less.

3. The computer-implemented method of claim 2, wherein the payload comprises 160 or fewer 7-bit alphanumeric characters, 140 or fewer 8-bit characters, or 70 or fewer 2-byte characters.

4. The computer-implemented method of claim 3, wherein the text message complies with a short messaging service (SMS) format.

5. The computer-implemented method of claim 1, wherein the request comprises a Hyper Text Transfer Protocol (HTTP) command.

6. The computer-implemented method of claim 1, wherein the text message comprises a request for information, the information being selected from the group consisting of address or telephone information for a business, a residence or a person; directions from a first location to a second location; entertainment information; weather information; a stock quotation; a definition of a word; location information corresponding to an area code; and location information corresponding to a zip code.

7. The computer-implemented method of claim 1, wherein the text message comprises a request for a specific fact.

8. The computer-implemented method of claim 1, wherein the response comprises a graphic of a mobile device associated with the response text message.

9. A computer-implemented method of emulating a mobile device messaging operation, comprising:

receiving a request from a web browser that includes a text message;

submitting the text message to a text message service provider;

receiving from the text message service provider a response text message that is responsive to the text message; and generating a response, formatted for display on the web browser, that includes the response text message; wherein the response comprises a graphic of a mobile device around the response text message; and before receiving the request from the web browser, providing for the web browser a document having the graphic of the mobile device and capable of receiving user requests associated with the graphic.

10. A computer-implemented method of emulating a mobile device messaging operation, comprising:

receiving in a web browser executed on a first computer system, a first text message from a user and transmitting the first text message;

receiving one or more responses to the first text message in the form of one or more web browser communications including a second text message, wherein the one or more responses are sent from a second computer system external to the first computer system; and displaying the second text message, within a graphic that depicts a mobile device, on a page in the web browser.

11. The computer-implemented method of claim 10, wherein the second text message is displayed in a manner that emulates display of the second text message by the depicted mobile device.

12. The computer-implemented method of claim 11, further comprising displaying to the user the graphic depicting the mobile device and a text messaging area in the graphic, before receiving the first text message.

13. The computer-implemented method of claim 11, further comprising displaying a first response text message corresponding to the graphic depicting the mobile device on a first web browser page, and displaying a second response message on a second web browser page.

14. The computer-implemented method of claim 10, wherein the text message comprises a request for information, the information being selected from the group consisting of address or telephone information for a business, a residence or a person; directions from a first location to a second location; entertainment information; weather information; a stock quotation; a definition of a word; location information corresponding to an area code; and location information corresponding to a zip code.

15. The computer-implemented method of claim 10, wherein the text message comprises a request for a specific fact.

16. A system for emulating a mobile device messaging operation in a web browser page, comprising:

an interface that receives a text message from at least one of a mobile device and a web browser;

an external response message generator that generates a response text message that is responsive to content in the text message; and a means for formatting the response text message for display on a web browser page so that it is displayed on a web browser page within a graphic depicting a mobile device, to emulate display of the response text message by the depicted mobile device.

17. The system of claim 16, wherein the text message comprises a request for information, the information being selected from the group consisting of address or telephone information for a business, a residence or a person; directions from a first location to a second location; entertainment information; weather information; a stock quotation; a definition of a word; location information corresponding to an area code; and location information corresponding to a zip code.

18. The system of claim 17, wherein the response message generator comprises:

a message parser that identifies one or more components of the text message a message component router that routes the one or more components to at least one of a plurality of component processors based on content of the one or more components; and an aggregator that generates the response text message from output of one or more component processors.

19. The system of claim 18, wherein the plurality of component processors includes at least one of:

a contact-information processor that receives a component that identifies a business, a residence or a person and provides output comprising at least one of a corresponding telephone number and a corresponding address;

a directions processor that receives a component that identifies a first location and a second location and provides output comprising directions from the first location to the second location;

an entertainment-information processor that receives a component that identifies an entertainment event and provides output comprising at least one of a location associated with the entertainment event and a description of one aspect of the entertainment event;

a weather-information processor that receives a component that identifies a location and provides output comprising current weather information associated with the location;

a stock-quotation processor that receives a component that identifies a stock or fund ticker symbol and provides output comprising at least one of a recent exchange price, a recent volume, a recent opening price, a recent range, and a recent corresponding market capitalization;

a definition processor that receives a component that identifies a word and provides output comprising a definition of the identified word;

an area-code processor that receives a component that identifies an area code and provides output comprising a location associated with the identified area code; and a zip-code processor that receives a component that identifies a zip code and provides output comprising a location associated with the identified zip code.

* * * * *